US006754724B2

(12) United States Patent
Horikawa et al.

(10) Patent No.: US 6,754,724 B2
(45) Date of Patent: Jun. 22, 2004

(54) KERNEL CREATOR FOR CREATING KERNEL CAPABLE OF EXECUTING ENTERTAINMENT PROCESSING USING A PERIPHERAL DEVICE

(75) Inventors: Tsutomu Horikawa, Tokyo (JP); Tadayasu Hakamatani, Tokyo (JP)

(73) Assignee: Sony Computer Entertainment Inc. (JP)

( * ) Notice: Subject to any disclaimer, the term of this patent is extended or adjusted under 35 U.S.C. 154(b) by 380 days.

(21) Appl. No.: 09/797,515

(22) Filed: Mar. 1, 2001

(65) Prior Publication Data

US 2001/0054120 A1 Dec. 20, 2001

(30) Foreign Application Priority Data

Mar. 2, 2000 (JP) ........................................ 2000-058044
Feb. 27, 2001 (JP) ........................................ 2001-052361

(51) Int. Cl.[7] .......................... G06F 3/00; G06F 13/28; G06F 13/12
(52) U.S. Cl. ................................. 710/8; 710/5; 710/10; 710/15; 710/22; 710/62; 713/1; 713/2; 713/100; 714/1; 714/5; 714/43; 709/212
(58) Field of Search ........................... 710/5, 8, 10, 15, 710/22, 62, 100, 2; 711/170; 713/1, 2, 100; 379/32, 33; 714/1, 5, 43, 47; 709/212

(56) References Cited

U.S. PATENT DOCUMENTS 5,485,579 A * 1/1996 Hitz et al. .................. 709/221
5,675,795 A 10/1997 Rawson, III et al.
5,778,226 A * 7/1998 Adams et al. ............... 719/311
6,065,037 A * 5/2000 Hitz et al. ................... 709/200
6,298,370 B1 * 10/2001 Tang et al. .................. 709/102
6,321,276 B1 * 11/2001 Forin ............................ 710/3
6,434,459 B2 * 8/2002 Wong et al. .................. 701/36

FOREIGN PATENT DOCUMENTS

| EP | 0 646 865 A2 | 4/1995 |
| EP | 0 866 403 A1 | 9/1998 |
| EP | 0 927 938 A1 | 7/1999 |
| JP | 10-301889 | 11/1998 |

OTHER PUBLICATIONS

"Guide to Windows 2000 for Beginners," 2nd Edition, ASCII/V, vol. 5 #8, pp. 218–219, Aug. 1999.

* cited by examiner

Primary Examiner—Rehana Perveen
Assistant Examiner—Angel L. Casiano
(74) Attorney, Agent, or Firm—Lerner, David, Littenberg, Krumholz & Mentlik, LLP

(57) ABSTRACT

An entertainment apparatus includes a storage unit that stores outside a kernel a device driver for a peripheral device. To make the peripheral device operable, a CPU causes an I/O processor to execute the device driver using a remote procedure call. Data is transferred between the peripheral device and the CPU through a direct memory access using a communication protocol that is commonly used in the apparatus.

29 Claims, 5 Drawing Sheets

KERNEL CREATOR FOR CREATING KERNEL CAPABLE OF EXECUTING ENTERTAINMENT PROCESSING USING A PERIPHERAL DEVICE

BACKGROUND OF THE INVENTION

The present invention relates to an entertainment apparatus capable of carrying out entertainment processing including reproduction of sounds and images based on digital information recorded on a secondary storage medium, such as a CD-ROM or DVD-ROM, and in particular, to a technique for controlling a peripheral device connected to the entertainment apparatus.

An entertainment apparatus such as an entertainment-dedicated computer for a game or the like, performs given entertainment processing cooperatively with peripheral devices, such as a controller and an external storage medium, connected thereto. Specifically, an entertainment apparatus carries out given entertainment processing based on inputs from peripheral devices such as a controller and an external storage medium, and outputs its results to a display unit such as a television receiver, and a speaker. Thus, the method of control of the peripheral devices connected to the entertainment apparatus is very important.

In general, control of the peripheral devices is achieved by part of a kernel which is a main function of an OS (operating system)

In recent years, a technique called "microkernel" has been available, wherein device drivers having program codes for controlling peripheral devices are put outside a kernel so as to enhance generality or compatibility for the peripheral devices. This microkernel technique is suitable for an entertainment apparatus that is required to receive diversified peripheral devices depending on the type of entertainment.

However, due to the high generality, the microkernel has difficulty dealing with each of the peripheral devices on a high level. As a result, its processing tends to become insufficient when an entertainment apparatus is used as a game apparatus that requires realtime processing.

On the other hand, a technique has also been available wherein a dedicated processor for controlling peripheral devices is provided in addition to a CPU that creates a kernel.

Entertainment apparatus normally have no primary mass storage mediums. In such an entertainment apparatus, program codes read from a secondary storage medium such as a CD-ROM are essential. In this case, in order to reduce the load imposed on a CPU, the entertainment apparatus is provided with, for example, an I/O (input/output) processor for performing such program code reading, decoding and expansion of the read program codes, and other processes.

In the entertainment apparatus having such an I/O processor, the I/O processor can be used as the foregoing dedicated processor for controlling peripheral devices.

In this case, however, exchange of information including program codes and necessary data is essential between the I/O processor and the CPU. As a result, the number of times that information is copied and transferred in the entertainment apparatus tends to increase, which is not preferable for an entertainment apparatus requiring high-speed processing. Further, the time that the CPU waits for the processing of the I/O processor tends to be prolonged, which also impedes high-speed processing.

SUMMARY OF THE INVENTION

Therefore, it is an object of the present invention to provide an improved technique that eliminates one or more of the disadvantages inherent in the prior art.

According to one aspect of the present invention, an entertainment apparatus is provided having storing means for storing program codes outside a kernel. When the program codes are executed, a peripheral device is made operable. The peripheral device is connected to the entertainment apparatus with device connecting means. A kernel creator for executing entertainment processing uses the peripheral device connected to the device connecting means. The kernel creator is made operable through the device connecting means. The kernel creator causes control means to execute the program codes based on a remote procedure call to make the peripheral device operable.

The remote procedure call is a technique wherein execution of part of an entertainment processing program, i.e. execution of a certain procedure included in the program, is entrusted to other execution means and the result of the execution is returned as return values as in a regular procedure call. In the present invention, the program codes for controlling the peripheral device are stored outside the kernel, and the control means (for example, a peripheral device control dedicated processor which is provided separately from a CPU) executes a certain procedure while the kernel creator executes the entertainment processing program. The control means reads the program codes and executes them to make the peripheral device operable. With this arrangement, the program codes for the peripheral device are located not only outside the kernel, but are also located outside hardware resources (e.g. CPU and memory) that are managed by the kernel. This improves the efficiency of the hardware resources to increase the processing speed of the whole apparatus. Thus, the apparatus can even achieve high-speed processing for temporary realtime processing.

Based on the remote procedure call, the kernel creator causes the control means to read the program codes from the storing means and to transfer the result of execution of the program codes through a direct memory access. Various implementations may be adopted for carrying out the direct memory access. Preferably, a queue is provided between the kernel creator and the peripheral device. The control means performs data exchange between the peripheral device and the queue based on a first direct memory access. The control means also performs data exchange between the kernel creator and the queue based on a second direct memory access which is asynchronous with the first direct memory access. With this arrangement, information may be stored on the queue even during execution of the entertainment processing.

Further, by performing the remote procedure call based on the direct memory access, information addressed to the kernel creator from the peripheral device may be directly transferred. This reduces the number of times that information is copied and transferred, which would otherwise have been a problem in the prior art.

The data exchange by the first direct memory access and the data exchange by the second direct memory access may be executed according to a communication protocol which is commonly used at least in the apparatus. With this arrangement, realtime processing is further ensured. A general purpose protocol used in the Ethernet, for example, may be used as the communication protocol. Accordingly, control of the apparatus free of a peripheral device is realized. Further, compatibility of program codes for peripheral devices is ensured.

The peripheral device may be detachably connected to the device connecting means and may include a secondary storage medium. The secondary storage medium stores data to be used upon execution of the program codes. Upon execution of the program codes, the data stored in the secondary storage medium is transferred to the kernel creator through a direct memory access.

According to another aspect of the present invention, a kernel function mechanism is provided in the entertainment apparatus for controlling a peripheral device connected to the entertainment apparatus. The entertainment apparatus has a kernel creator for executing entertainment processing using the peripheral device. The peripheral device is made operable through execution of program codes. The program codes are stored outside a kernel. The kernel creator causes control means to execute the program codes based on a remote procedure call to make the peripheral device operable.

Data transfer addressed to the kernel creator from the peripheral device may be performed by a direct memory access.

Data transfer may be performed according to a communication protocol commonly used in the apparatus.

According to another aspect of the present invention, a control method is provided for controlling a peripheral device connected to an entertainment apparatus. The entertainment apparatus comprises a kernel creator for executing entertainment processing using the peripheral device. The peripheral device is made operable through execution of program codes. The program codes are stored outside a kernel. The kernel creator causes control means to execute the program codes based on a remote procedure call to make the peripheral device operable.

Data transfer addressed to the kernel creator from the peripheral device may be performed by a direct memory access.

Data transfer may be performed according to a communication protocol commonly used in the apparatus.

According to another aspect of the present invention, an entertainment apparatus is provided comprising control means for executing program codes stored outside a kernel. A device connecting means for connecting a peripheral device makes the peripheral device operable through execution of the program codes. A kernel creator comprising a semiconductor device causes the control means to execute the program codes based on a remote procedure call to make the peripheral device operable. Entertainment processing is then executed using the kernel creator and the peripheral device.

According to another aspect of the present invention, a computer program is provided for operating, as an entertainment apparatus, a computer having control means for executing program codes stored outside a kernel. A peripheral device is connected to the computer with device connecting means. When the program codes are executed, the peripheral device is operable. The computer program causes the entertainment apparatus to cause the control means to execute the program codes based on a remote procedure call to make the peripheral device operable. Entertainment processing is then executed using the peripheral device.

BRIEF DESCRIPTION OF THE DRAWINGS

The present invention will be understood more fully from the detailed description given below, taken in conjunction with the accompanying drawings.

DETAILED DESCRIPTION

Now, a preferred embodiment of an entertainment apparatus according to the present invention will be described below with reference to the accompanying drawings.

Figure 1:
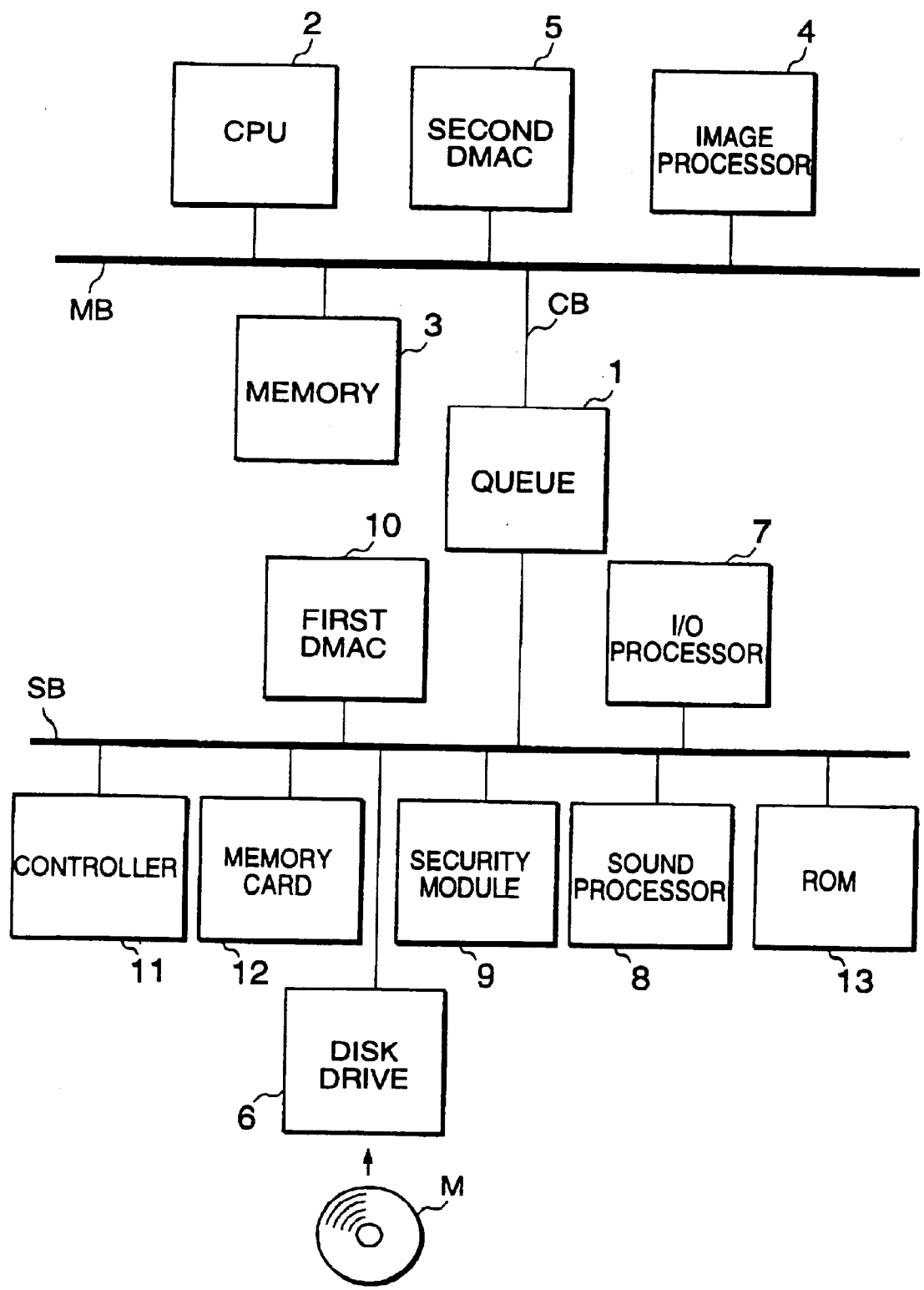
FIG. 1 is a diagram showing a hardware structure of an entertainment apparatus according to a preferred embodiment of the present invention.

FIG. 1 shows a structure of the entertainment apparatus according to this embodiment.

The entertainment apparatus is a type of computer which can be used as a game apparatus, for example. The entertainment apparatus comprises a main bus MB and a sub-bus SB connected via a center bus CB provided with a queue 1. The entertainment apparatus further comprises various function realizing elements connected to the main bus MB and the sub-bus SB.

The main bus MB is connected to a CPU 2, a memory 3, an image processor 4 and a second DMAC (direct memory access controller) 5. The sub-bus SB is connected to a disk drive 6, an I/O processor 7, a sound processor 8, a security module 9, a first DMAC 10, a controller 11, a memory card 12 and a ROM 13.

The CPU 2 is a semiconductor device comprising a microprocessor. The microprocessor controls the whole operation of the entertainment apparatus and enables execution of game processing, as an example of entertainment processing, including sound and image reproduction based on various data resulting from the execution of the game processing. Further, upon starting up the entertainment apparatus, the microprocessor reads a boot program from the ROM 13 connected to the sub-bus SB and executes the boot program to start an OS for creating a kernel.

The memory 3 comprises a RAM and provides a working area for the CPU 2. Digital information, such as program codes and data for the game processing, read from a secondary storage medium M is written into the memory 3.

In this embodiment, program codes and data necessary for controlling a peripheral device are not written into the memory 3, which will be described later. In the following description, if it is necessary to distinguish between the program codes for the game processing and the program codes for controlling the peripheral device, the former will be referred to as "application" and the latter will be referred to as "device driver".

Based on the digital information stored in the memory 3, the image processor 4 produces, cooperatively with the CPU 2, image data necessary for displaying images on a display unit (not shown), such as polygon data for expressing game characters and others and texture data including color information for the polygon data. Specifically, the image processor 4 comprises a geometry processing unit for performing a coordinate conversion of data read in the course of the game processing from among the digital information stored in the memory 3, a decoder for decoding the contents of the geometry processing, a rendering unit for producing the foregoing image data per frame based on graphic or drawing data obtained through the geometry processing, and a mechanism for displaying the produced image data on the display unit.

The queue 1 temporarily stores information exchanged between the main bus MB and the sub-bus SB, that is, various commands and data which are used in the control of the peripheral device executed by the I/O processor 7 based on an RPC (remote procedure call). In this embodiment, the queue 1 temporarily stores, for example, information which is exchanged between the memory 3 and the I/O processor 7, between the memory 3 and the controller 11 or the memory card 12, or between these devices and other devices.

The disk drive 6 receives the secondary storage medium M such as a CD-ROM or DVD-ROM, and reads the digital information, i.e. the application and data, from the secondary storage medium M. The application represents program codes for controlling the development of the game and reproducing sounds and images following the development of the game, while the data represent data which are used for reproducing the sounds and images. In this embodiment, the application and data are recorded in the secondary storage medium M after they have been compressed and partly encrypted. Alternatively, encryption may be applied to all the compressed application and data.

The I/O processor 7 is a semiconductor device which controls the disk drive 6 to read the application and data from the secondary storage medium M and further carries out decoding and expansion of the read digital information cooperatively with the security module 9. A program (control program) that accomplishes these functions of the I/O processor 7 is stored, for example, in the ROM 13, and the I/O processor 7 executes it upon the start of the entertainment apparatus.

The security module 9 is in the form of a single semiconductor chip having a dedicated processor and a memory. This dedicated processor functions to ensure security of the entertainment apparatus. The security module 9 holds decoding keys which are necessary for the I/O processor 7 to decode the digital information. The security module 9 sends a necessary decoding key to the I/O processor 7 when the I/O processor 7 performs decoding of the digital information. In this embodiment, the security module 9 also can independently perform decoding of encrypted digital information.

The sound processor 8 is connected to a speaker (not shown). The sound processor 8 reads data corresponding to a sound command sent from the I/O processor 7 or the first DMAC 10, from a sound memory (not shown) provided in the sound processor 8 to produce sound data, and outputs the produced sound data to the speaker. In response thereto, the speaker generates sound effects for the game or BGM sounds or the like for the image under the control of the sound processor 8.

The controller 11 and the memory card 12 are examples of peripheral devices connected to the entertainment apparatus. Specifically, the controller 11 and the memory card 12 are connected to the sub-bus SB via respective input terminals (not shown). The controller 11 and the memory card 12 are each made operable through execution of a corresponding device driver. In this embodiment, the sub-bus SB forms device connecting means cooperatively with the foregoing input terminal and a control mechanism (not shown) for the sub-bus SB.

The controller 11 is an input device for inputting into the entertainment apparatus a request of a game player. For example, the controller 11 is operated for inputting a request for moving a cursor in an upward, downward, rightward or leftward direction or inputting a request for execution of a certain process.

The memory card 12 comprises a flash memory (flash ROM) encased in a card of a given size. When a game is of a type which produces recordable game data during the progress of the game, upon interruption of the game or at the end of the game, a game player uses the memory card 12 to record the game data. Instead of the memory card 12 or in addition to the memory card 12, a flash memory may be incorporated in the controller 11.

The first DMAC 10 and the second DMAC 5 cooperatively work to allow the I/O processor 7 to perform the RPC by a DMA (direct memory access).

The first DMAC 10 controls at least reading and writing of information exchanged between the controller 11 and/or the memory card 12 and the queue 1. The second DMAC 5 controls at least reading and writing of information exchanged between the memory 3 and the queue 1.

In this embodiment, two DMACs are provided for agreement with the number of buses. However, the first DMAC 10 and the second DMAC 5 may be realized by one control module.

In this embodiment, all requests from the executed application to the controller 11 are carried out based on an RPC through a DMA. For this purpose, a device driver necessary for operating the controller 11 is stored in storing means outside the kernel, such as the secondary storage medium M, the flash memory of the memory card 12 or the ROM 13, and is allowed to be executed by the I/O processor 7 during the execution of the application. In this embodiment, the device driver is stored in the ROM 13.

Figure 2:
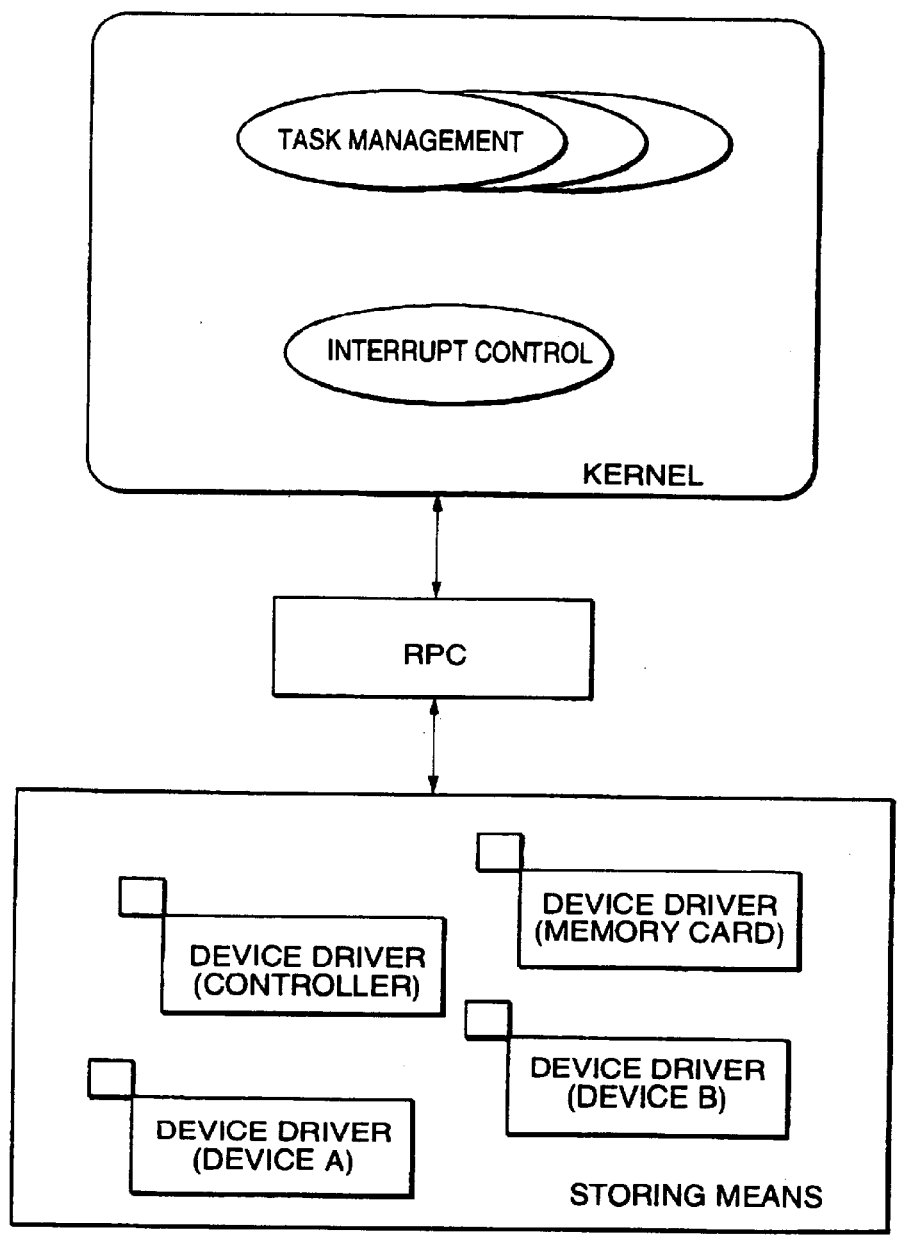
FIG. 2 is a diagram explaining the structure of a kernel according to the preferred embodiment.

FIG. 2 shows a structure of a kernel according to this embodiment. Specifically, the kernel is formed to perform a task management function and an interrupt control function. The kernel (excluding microkernel) in a conventional entertainment apparatus of this type is also provided with device drivers for peripheral devices. On the other hand, in this embodiment, the device drivers for peripheral devices are stored in the storing means outside the kernel, i.e. in the ROM 13. When control of a peripheral device such as the controller 11 becomes necessary, the CPU 2 causes the I/O processor 7 to read the corresponding device driver from the ROM 13 and execute it through the RPC. This renders the controller 11 operable. When the peripheral device is controlled based on the RPC, the result of the control is transferred to the kernel as so-called return values. In this embodiment, since this transfer is performed by the DMA, high-speed control of the peripheral device is achieved.

Now, a peripheral device control method in the entertainment apparatus having the foregoing kernel function creating mechanism will be described with reference to FIGS. 3 to 5.

Among the various functions of the kernel, the operation of the peripheral device control function will now be explained. In the following explanation, the peripheral device is assumed to be the controller 11. However, the following explanation may also be applicable to other peripheral devices. The RPC is executed not using a dedicated communication protocol, but using a communication protocol that is commonly used in the entertainment apparatus.

Figure 3:
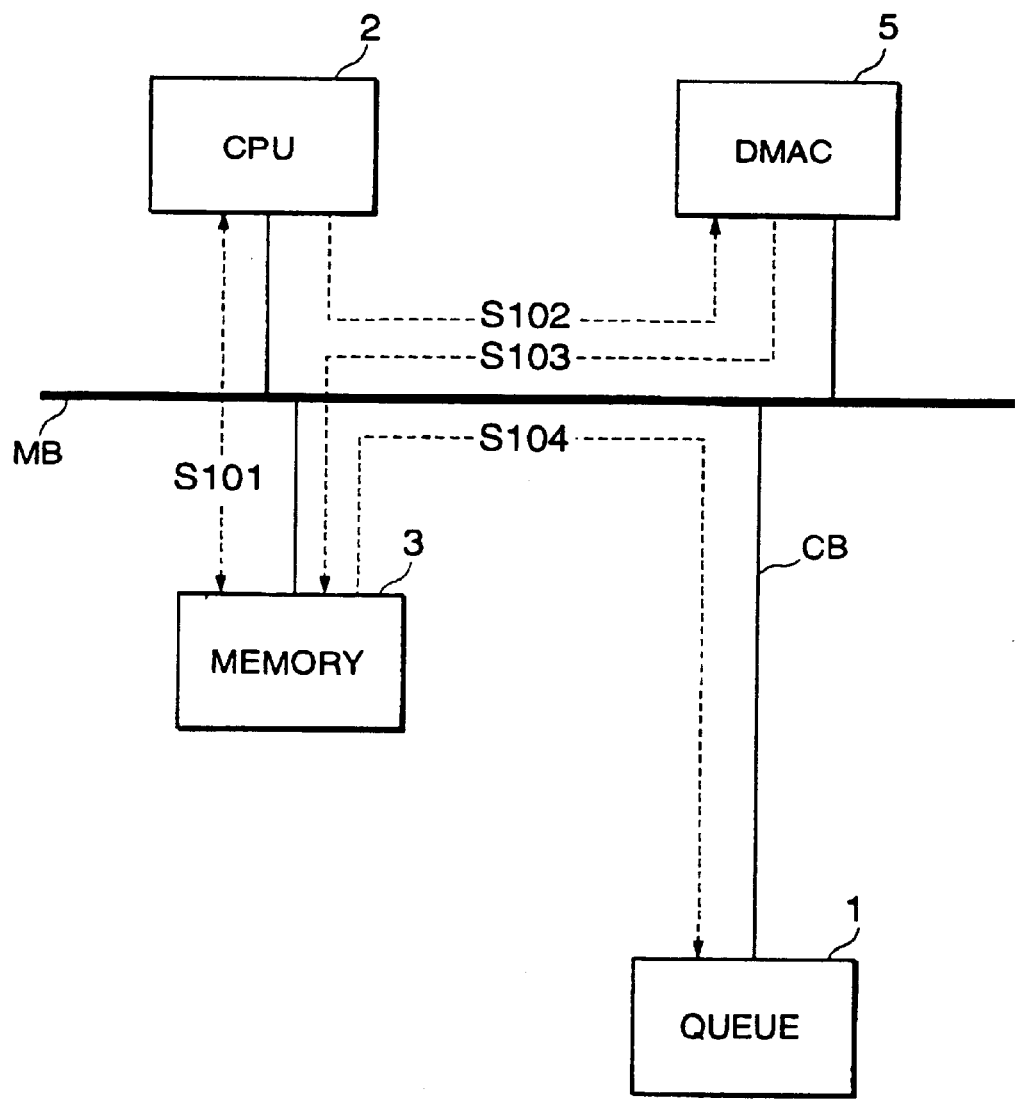
FIG. 3 is a diagram explaining a processing procedure when an action occurs from an application to a controller.

As shown in FIG. 3, while the CPU 2 executes the application based on the program codes and data stored in the memory 3 (step S101), if some action of the controller 11 is required, the application makes a RPC request for the action (step S102). For example, if the controller 11 is provided with a vibration generating mechanism and it is required to operate this vibration generating mechanism to enhance the entertainment effect in a given scene of the game, the application provides information necessary for operating the vibration generating mechanism. This information is transferred from the memory 3 to the queue 1 by the second DMAC 5 through a DMA and temporarily stored in the queue 1 (steps S103 and S104).

Figure 4:
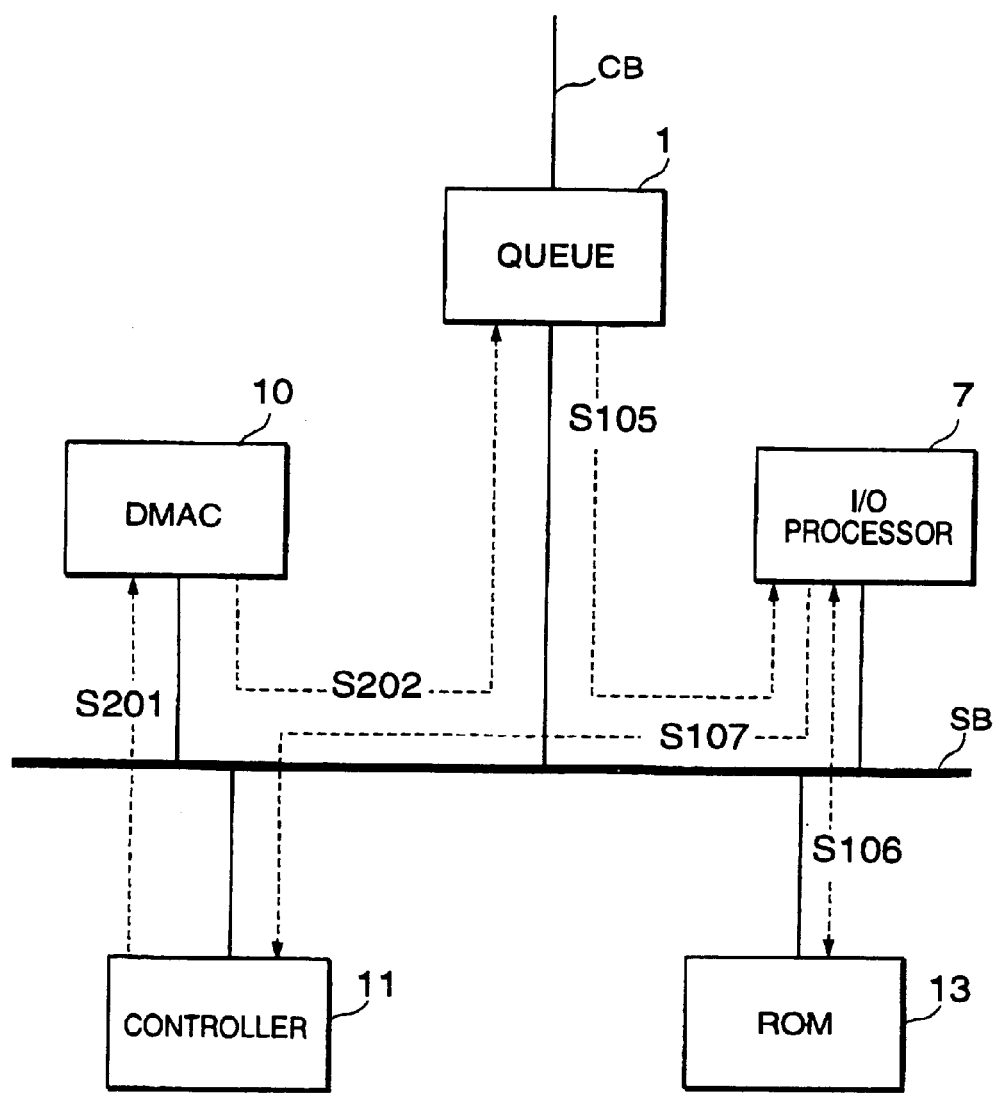
FIG. 4 is a diagram explaining a processing procedure for data exchange via a queue.

Referring now to FIG. 4, the I/O processor 7 seeks the device driver of the controller 11 from the ROM 13 based on the information stored in the queue 1 and executes it (steps S105 and S106). Accordingly, the request from the application is transferred to the controller 11 without passing through the CPU 2 (step S107).

In FIG. 4, data generated in the controller 11 is temporarily stored in the queue 1 via the first DMAC 10 (steps S201 and S202). The data includes, for example, data input by a game player using the controller 11, or data from analog and digital inputs used in the controller 11 when both inputs can be used.

Figure 5:
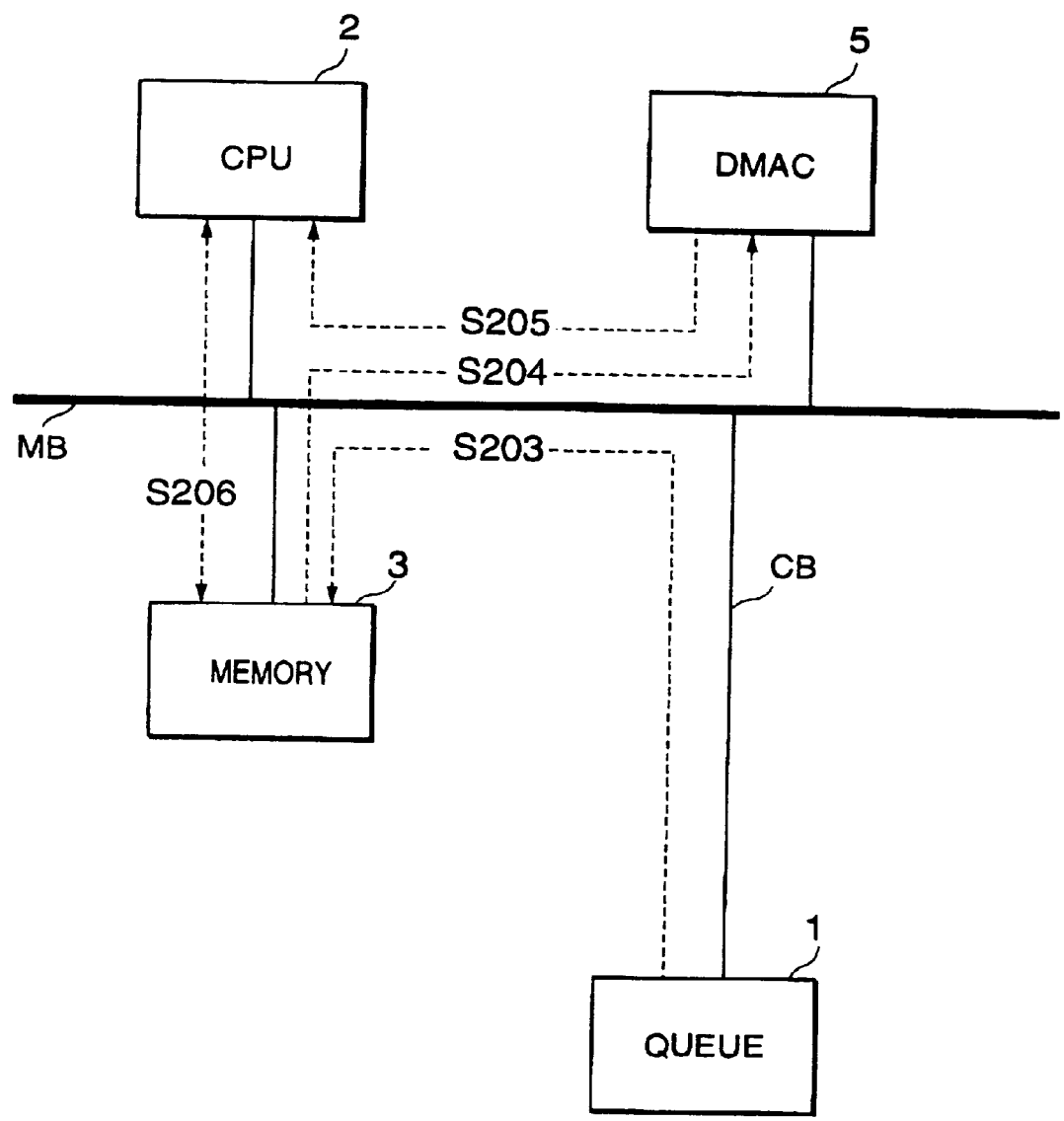
FIG. 5 is a diagram explaining a processing procedure when data generated in the controller is transferred to the application.

Referring now to FIG. 5, the data stored in the queue 1 is read by the second DMAC 5 at a given timing and transferred to the memory 3 (step S203). The second DMAC 5 notifies the CPU 2 that the data has been stored in the memory 3 (steps S204 and S205). The CPU 2 uses the data stored in the memory 3 as data for subsequent execution of the application (step S206). For example, when a key input for rightward movement has occurred in the controller 11, a given character displayed on the display unit is moved rightward.

In the foregoing fashion, the transfer of the request from the application to the controller 11 and the transfer of the data from the controller 11 to the application can be easily realized using the DMA. In this case, the request and data are transferred and stored in the memory 3 without being directly processed by the CPU 2. The RPC is a mechanism having a high affinity with parallel programming. Thus, the CPU 2 does not need to wait for a long time for a response from the I/O processor 7. This reduces the number of times that information is copied and transferred that would otherwise have been a problem in many systems having an I/O processor, so that a high processing rate of the CPU 2 is achieved.

As described above, in the entertainment apparatus according to this embodiment, when the entertainment processing is performed using the controller 11, the device driver for the controller 11 is executed through the RPC. This makes it possible to place the device driver not only outside the kernel, but also outside the resources (CPU 2 and memory 3) managed by the kernel, so that the execution efficiency of the entertainment processing is improved.

Further, since the RPC is executed through the DMA, the direct data transfer from the controller 11 to the memory 3 is achieved to reduce the number of times that data is copied and transferred in the CPU 2.

Further, since data exchange between the controller 11 and the queue 1 and data exchange between the queue 1 and the CPU 2 (kernel) are executed through the mutually asynchronous DMAs, even if there is some time-lag between an occurrence of a request from the application and an occurrence of data generation in the controller 11, data exchange can be stably carried out. Further, since the data exchange is performed based on a communication protocol commonly used in the apparatus, control of the apparatus free of a device driver is realized.

While the present invention has been described in terms of the preferred embodiment, the invention is not to be limited thereto, but can be embodied in various ways without departing from the principle of the invention as defined in the appended claims.

In the foregoing description, explanation has been made of the characteristic kernel function mechanism achieved by the entertainment apparatus as shown in FIG. 1 and the peripheral device control method using this kernel function mechanism. On the other hand, the present invention is also applicable to a case wherein a computer program (excluding an application and device drivers) is read into a general purpose computer installed with an OS and executed by the computer so that the foregoing kernel function mechanism and peripheral device control method are achieved. Further, the foregoing kernel function mechanism and peripheral device control method can also be achieved with cooperation of a general purpose computer installed with an OS and one or more semiconductor devices. The semiconductor device includes a processor and is installed with a program for providing required functions to the processor.

What is claimed is:

1. An entertainment apparatus, comprising:
   device connecting means for connecting a peripheral device to the entertainment apparatus;
   storing means for storing program codes outside a kernel, said program codes for operating the peripheral device;
   control means for executing said program codes; and
   a kernel creator for creating a kernel capable of executing entertainment processing using the peripheral device, said kernel creator performing a remote procedure call to cause said control means to read said program codes from said storing means, execute said program codes and return an execution result to the kernel when control of the peripheral device is needed, thereby making the peripheral device operable.

2. The entertainment apparatus according to claim 1, wherein said kernel creator causes said control means to read said program codes from said storing means and to transfer said execution result through direct memory access.

3. The entertainment apparatus according to claim 2, further comprising a queue coupled to said kernel creator and the peripheral device, wherein said control means exchanges data between the peripheral device and said queue using a first direct memory access controller, and said control means exchanges data between said kernel creator and said queue using a second direct memory access controller, said second direct memory access controller operating asynchronously with said first direct memory access controller.

4. The entertainment apparatus according to claim 3, wherein the data exchange by said first direct memory access controller and the data exchange by said second direct memory access controller are executed using a communication protocol that is commonly used in the entertainment apparatus.

5. The entertainment apparatus according to claim 1, wherein the peripheral device is detachably connected to said device connecting means, and the peripheral device includes a secondary storage medium that stores data, the data being transferred to said kernel creator through direct memory access following execution of said program codes.

6. In an entertainment apparatus, a kernel function mechanism for controlling a peripheral device connected to the entertainment apparatus, said kernel function mechanism comprising:
   a plurality of program codes stored outside a kernel, said program codes for operating the peripheral device;
   control means for executing said program codes; and a kernel creator for creating a kernel capable of executing entertainment processing using the peripheral device, said kernel creator performing a remote procedure call to cause said control means to read said stored program codes, execute said plurality of program codes and return an execution result to the kernel when control of the peripheral device is needed, thereby making the peripheral device operable.

7. The kernel function mechanism according to claim 6, wherein the peripheral device transfers data addressed to said kernel creator from the peripheral device using direct memory access.

8. The kernel function mechanism according to claim 7, wherein said data transfer is performed according to a communication protocol commonly used in the entertainment apparatus.

9. The kernel function mechanism according to claim 6, further comprising a queue coupled to said kernel creator and the peripheral device, wherein said control means exchanges data between the peripheral device and said queue using a first direct memory access controller, and said control means exchanges data between said kernel creator and said queue using a second direct memory access controller, said second direct memory access controller operating asynchronously with said first direct memory access controller.

10. A method for controlling a peripheral device that is in communication with an entertainment apparatus, comprising:
storing program codes outside a kernel in the entertainment apparatus, the program codes for operating the peripheral device;
employing a kernel creator to create a kernel capable of executing entertainment processing using the peripheral device, the kernel creator performing a remote procedure call to cause a control means to read the stored program codes, execute the program codes and return an execution result to the kernel when control of the peripheral device is needed, thereby making the peripheral device operable; and
executing entertainment processing using the peripheral device.

11. The method according to claim 10, wherein the step of executing the program codes includes at least transferring data addressed to the kernel creator from the peripheral device using direct memory access.

12. The method of claim 11, wherein the transferring of data uses a communication protocol commonly used in the entertainment apparatus.

13. A semiconductor device in an entertainment apparatus, the entertainment apparatus having control means for executing program codes stored outside a kernel and having device connecting means for connecting a peripheral device to the entertainment apparatus, the program codes for operating the peripheral device, said semiconductor device comprising:
a kernel creator that creates a kernel capable of executing entertainment processing using the peripheral device, said kernel creator performing a remote procedure call to causes the control means to read the stored program codes, execute the program codes and return an execution result to the kernel when control of the peripheral device is needed, thereby making the peripheral device operable.

14. The semiconductor device according to claim 13, wherein said kernel creator causes the control means to read the program codes from a storing means and to transfer the execution result through direct memory access.

15. The semiconductor device according to claim 13, wherein data is transferred to and from said kernel creator using a communication protocol that is commonly used in the entertainment apparatus.

16. A method of using a computer program for operating a computer as an entertainment apparatus, the computer having control means for executing program codes stored outside a kernel in the computer and having device connecting means for connecting the computer to a peripheral device, the program codes for operating the peripheral device, said method comprising:
establishing communication between the control means and the peripheral device;
creating a kernel capable of executing entertainment processing using the peripheral device;
performing a remote procedure call to cause the control means to read the stored program codes, execute the program codes and return an execution result to the kernel when control of the peripheral device is needed, thereby making the peripheral device operable; and
executing entertainment processing using the peripheral device.

17. An entertainment apparatus, comprising:
a connector operable to connect a peripheral device to the entertainment apparatus;
a memory for storing program codes outside a kernel, said program codes for operating the peripheral device;
a first processor; and
a second processor for creating a kernel capable of executing entertainment processing using the peripheral device, said second processor performing a remote procedure call to cause said first processor to read said program codes from said memory, execute said program codes and return an execution result to the kernel when control of the peripheral device is needed, thereby making the peripheral device operable.

18. The entertainment apparatus according to claim 17, wherein said second processor causes said first processor to read said program codes from said memory and to transfer said execution result through direct memory access.

19. The entertainment apparatus according to claim 17, wherein data is transferred to and from said second processor using a communication protocol that is commonly used in the entertainment apparatus.

20. In an entertainment apparatus, a kernel function mechanism for controlling a peripheral device that is in communication with the entertainment apparatus, said kernel function mechanism comprising:
a first processor;
a plurality of program codes stored outside a kernel in the entertainment apparatus, said program codes for operating the peripheral device; and
a second processor for creating a kernel capable of executing entertainment processing using the peripheral device, said second processor performing a remote procedure call to cause said first processor to read said stored program codes, execute said plurality of program codes and return an execution result to the kernel when control of the peripheral device is needed, thereby making the peripheral device operable.

21. The kernel function mechanism according to claim 20, wherein said second processor causes said first processor to read said program codes from a memory and to transfer said execution result through direct memory access.

22. The kernel function mechanism according to claim 20, wherein data is transferred to and from said second processor using a communication protocol that is commonly used in the entertainment apparatus.

23. A method for controlling a peripheral device that is in communication with an entertainment apparatus having a kernel, said method comprising:

storing program codes outside the kernel, the program codes for operating the peripheral device;

employing a second processor to create a kernel capable of executing entertainment processing using the peripheral device, the second processor performing a remote procedure call to cause a first processor to read the stored program codes, execute the program codes and return an execution result to the kernel when control of the peripheral device is needed, thereby making the peripheral device operable; and executing entertainment processing using the peripheral device.

24. The method according to claim 23, wherein the second processor causes the first processor to read the program codes from a memory and to transfer said execution result through direct memory access.

25. The method according to claim 23, wherein data is transferred to and from the second processor using a communication protocol that is commonly used in the entertainment apparatus.

26. A semiconductor device in an entertainment apparatus, the entertainment apparatus having a first processor to execute program codes stored outside a kernel and being in communication with a peripheral device, the program codes for operating the peripheral device, said semiconductor device comprising:

a second processor that creates a kernel capable of executing entertainment processing using the peripheral device, said second processor performing a remote procedure call to causes the first processor to read the stored program codes, execute the program codes and return an execution result to the kernel when control of the peripheral device is needed, thereby making the peripheral device operable.

27. The semiconductor device according to claim 26, wherein said second processor causes the first processor to read the program codes from a memory and to transfer said execution result through direct memory access.

28. The semiconductor device according to claim 26, wherein data is transferred to and from said second processor using a communication protocol that is commonly used in the entertainment apparatus.

29. A method of using a computer program for operating a computer as an entertainment apparatus, the computer having a processor for executing program codes stored outside a kernel in the computer and being in communication with a peripheral device, the program codes for operating the peripheral device, said method comprising: establishing communication between the processor and the peripheral device;

creating a kernel capable of executing entertainment processing using the peripheral device;

performing a remote procedure call to cause the processor to read the stored program codes, execute the program codes and return an execution result to the kernel when control of the peripheral device is needed, thereby making the peripheral device operable; and executing entertainment processing using the peripheral device.

* * * * *